(12) United States Patent
Takahashi

(10) Patent No.: US 6,386,158 B1
(45) Date of Patent: May 14, 2002

(54) VALVE TIMING CONTROL APPARATUS FOR INTERNAL COMBUSTION ENGINES

(75) Inventor: Tatsuhiko Takahashi, Kobe (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/859,814

(22) Filed: May 18, 2001

(30) Foreign Application Priority Data

Nov. 17, 2000 (JP) .................................... 2000-351434

(51) Int. Cl.[7] .............................. F01L 1/34; F02D 13/02
(52) U.S. Cl. ................................. 123/90.15; 123/90.17
(58) Field of Search .................... 123/90.15, 90.17, 123/90.31; 74/568 R (56) References Cited

U.S. PATENT DOCUMENTS

| | | | | |
|---|---|---|---|---|
| 5,937,808 | A | * 8/1999 | Kako et al. ............... | 123/90.15 |
| 6,161,511 | A | * 12/2000 | Hashimoto ............... | 123/90.15 |
| 6,213,070 | B1 | * 4/2001 | Hashimoto et al. ...... | 123/90.15 |
| 6,260,524 | B1 | * 7/2001 | Wachi .................... | 123/90.15 |
| 6,318,314 | B1 | * 11/2001 | Otto et al. ............... | 123/90.15 |

FOREIGN PATENT DOCUMENTS

| | | |
|---|---|---|
| JP | 9-217609 | 8/1997 |
| JP | 9-256878 | 9/1997 |

* cited by examiner

*Primary Examiner*—Weilun Lo
(74) *Attorney, Agent, or Firm*—Sughrue Mion, PLLC (57) ABSTRACT

A valve timing control apparatus for internal combustion engines, capable of obtaining a stable responsibility, and correcting a scatter of the characteristics of the apparatus and the variation thereof occurring with the lapse of time is provided. A valve timing control apparatus is provided with a valve opening and closing cam adapted to be driven by a crankshaft of an internal combustion engine, a valve timing varying means adapted to vary a rotational phase between the (cam and crankshaft, a detector adapted to detect an acting position of the valve timing varying means, and a control means adapted to output a control variable with respect to the valve timing varying means, the control means storing normative characteristics of the valve timing varying means, computing a target valve timing position, comparing a valve timing position detected by the acting position detector and a valve timing position of the normative characteristics with each other with respect to a target valve timing position, and determining a control variable with respect to the valve timing varying means on the basis of the results of the comparison.

3 Claims, 8 Drawing Sheets

VALVE TIMING CONTROL APPARATUS FOR INTERNAL COMBUSTION ENGINES

BACKGROUND OF THE INVENTION

1. Field of the Invention

This invention relates to a valve timing control apparatus for internal combustion engines, adapted to control the timing of operations of an intake valve and an exhaust valve of an internal combustion engine.

2. Description of the Related Art

In an internal combustion engine, the timing of operations of intake and exhaust valves required varies in accordance with the condition of the engine. In most of related art internal combustion engines, a cam shaft is driven by a timing belt via a crankshaft, and the intake and exhaust valve opening and closing time is fixedly determined with respect to an angle of rotation of the crankshaft. However, in recent years, a variable valve timing system has come to be employed for improving an output of an internal combustion engine and reducing an exhaust gas and fuel consumption, and various kinds of valve timing control techniques have come to be disclosed.

For example, the techniques disclosed in Japanese Patent Laid-Open No. 256878/1997 are also included in these valve timing control techniques. The techniques disclosed in this publication are the techniques for driving a cam by changing a phase of rotation of an output shaft of an internal combustion engine, and thereby regulating the timing of an operation of at least one of intake and exhaust valves. These techniques include the steps of detecting the valve timing on the basis of a difference between a phase of the output shaft of the engine and that of a cam, setting a control gain of a valve timing regulator so that a phase of actual valve timing and target valve timing set on the basis of the operating condition of the engine agree with each other, determining a displacement speed of a phase of rotation of the cam on the basis of the transition of the actual valve timing, comparing the displacement speed of this phase of rotation with a normative displacement speed, and correcting the control gain so that a difference between the two speeds is corrected. Thus, a scatter of the displacement speed is offset, and the responsibility and convergence characteristics are improved.

To be exact, this valve timing regulating operation is carried out by outputting when a difference occurs between an actual valve timing and a target valve timing a duty ratio, which corresponds to the compensation for a response delay, and which is determined on the basis of a proportional value and a differential value computed on the basis of the deviation, to a hydraulic control valve, then outputting a duty ratio, which is determined in the same manner on the basis of a proportional value and a differential value computed on the basis of a deviation occurring at a certain point in time, to the hydraulic control valve, retaining the duty ratio until a difference between a target valve timing and actual valve timing becomes not higher than a predetermined level, determining a displacement speed of a rotational phase on the basis of variation of actual valve timing between two points during this duty ratio retaining time and a period of time needed for the occurrence of this variation, comparing this displacement speed with a speed of a normative level, setting small the response delay compensation duty ratio when the displacement speed is higher than the normative level, and setting large the response delay compensation duty ratio when the displacement speed is lower than the normative level.

In a related art valve timing control apparatus for internal combustion engines, a duty ratio determined at a certain point in time is outputted to a hydraulic control valve and retained therein so as to detect a displacement speed in a rotational phase. Therefore, the responsibility with respect to a control operation based on a duty ratio determined on the basis of a proportional value and a differential value computed on the basis of a difference between a target valve timing of each regular predetermined valve timing and an actual valve timing is deteriorated in some cases. In this control apparatus, a displacement speed of a detected rotational phase and a normative speed are compared with each other, and a duty ration is corrected in accordance with a difference therebetween. Therefore, a correction operation is carried out with respect to only a first response delay ascribed to the occurrence of a difference between a target valve timing and actual valve timing. Consequently, it cannot be said that a sufficient correction operation is carried out, so that a sufficient responsibility is not obtained in some cases.

SUMMARY OF THE INVENTION

The present invention has been made in view of the above-mentioned circumstances, and provides a valve timing control apparatus for internal combustion engines, capable of obtaining a stable responsibility with respect to a scatter of the construction of a hydraulic control valve occurring during the manufacturing thereof and variation of the valve occurring with the lapse of time, and correcting a scatter of flow rate characteristics by a control operation.

The valve timing control apparatus for internal combustion engines according to the invention is formed so that the apparatus is provided with a cam adapted to be driven by a crankshaft of an internal combustion engine and open and close an intake valve, a cam adapted to be driven by the crankshaft of the engine and open and close an exhaust valve, a valve timing varying means adapted to vary a rotational phase of at least one of the two cams with respect to the crankshaft, a detector adapted to detect an acting position of the valve timing varying means, and a control means adapted to output a control variable for the valve timing varying means, the control means being further adapted to store the characteristics constituting a norm for the valve timing varying means, compute a target valve timing position corresponding to the operating condition of the engine, and determine the control variable of the valve timing varying means with respect to the target valve timing position on the basis of the results of a comparison between a valve timing position detected by the acting position detector and a valve timing position included in the norm-constituting characteristics.

Therefore, a valve timing control apparatus for internal combustion engines, capable of stabilizing the characteristics thereof without being influenced by a scatter of the construction of the valve timing varying means occurring during the manufacturing thereof, offsetting variation of the performance of the apparatus due to the variation thereof occurring with the lapse of time, and alleviating the manufacturing tolerance thereof can be obtained.

The characteristics constituting a norm for the valve timing varying means are formed of model characteristics of a valve timing varying means fixed to an internal combustion engine,so that the valve timing characteristics required by the engine can be maintained as a scatter of the construction of the apparatus is offset.

The acting position of the valve timing varying means is detected on the basis of an angle of rotation of the crankshaft or that of a cam, and this enables the effect identical with that of the first invention to be obtained by the existing detectors, such as a crank angle sensor, etc.

DESCRIPTION OF THE PREFERRED EMBODIMENTS

Figure 1:
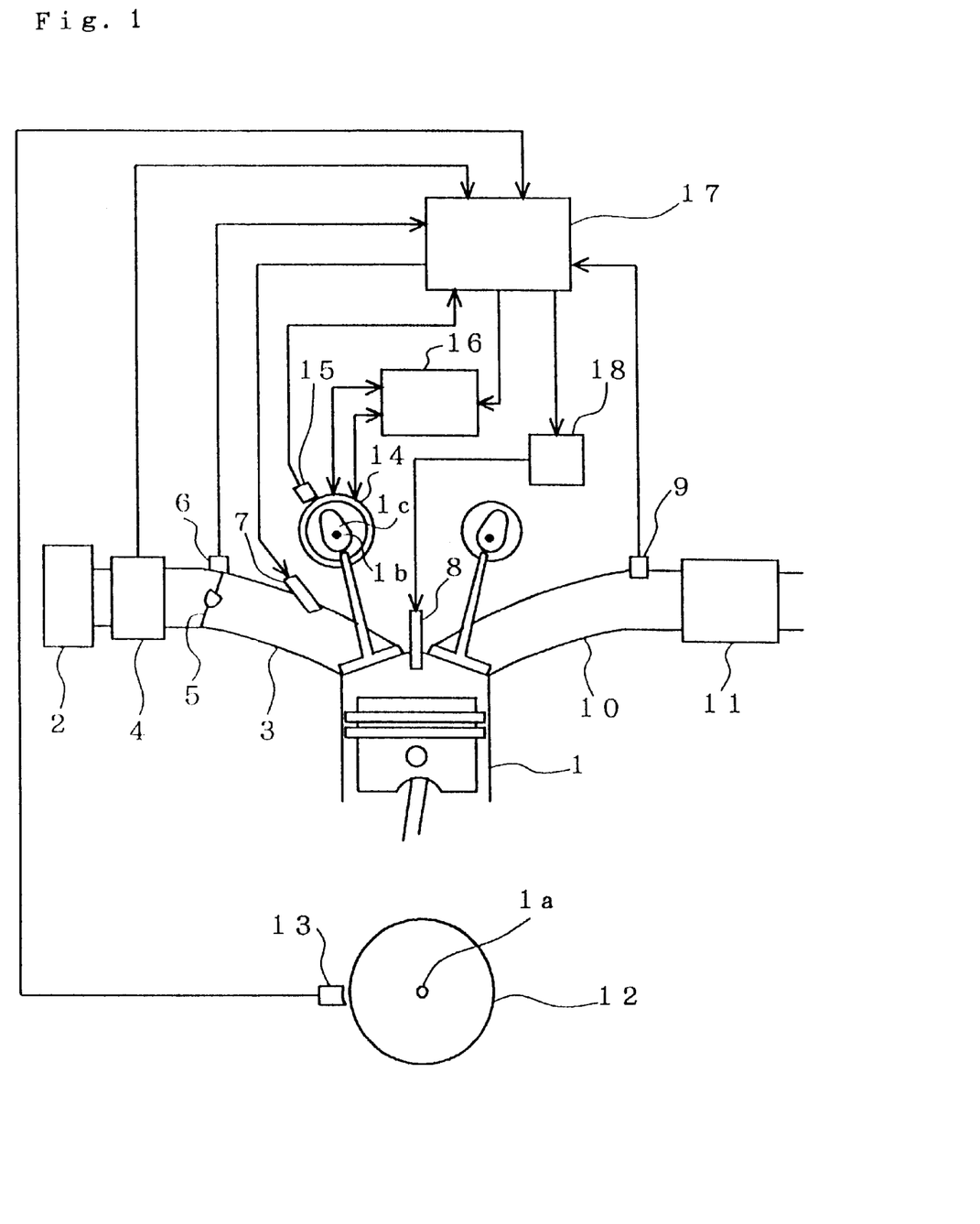
FIG. 1 is a drawing illustrating the construction of a mode 1 of embodiment of the valve timing control apparatus for internal combustion engines according to the invention.

FIGS. 1 to 8 are drawings for describing a mode 1 of embodiment of the valve timing control apparatus for internal combustion engines according to the invention. FIG. 1 illustrates the construction of a valve timing control apparatus fixed to an internal combustion engine, FIG. 2 a characteristic diagram describing a valve timing action, FIG. 3 a block diagram showing the construction of the control apparatus, FIG. 4 a block diagram showing the construction of a normative characteristic computation unit, FIG. 5 a block diagram showing the construction of a valve timing computation control means, FIG. 6 a block diagram showing the construction of a PD controller with respect to a normative model, FIG. 7 a block diagram of a correction variable computation unit, and FIG. 8 a block diagram showing the construction of the PD controller adapted to control an actual valve timing.

First, the construction of an internal combustion engine mounted with a valve timing control apparatus will be described with reference to FIG. 1 as follows. Referring to the drawing, a reference numeral 1 denotes an internal combustion engine, 2 an air cleaner provided in an intake passage of the engine 1, 4 an air flow sensor adapted to measure a flow rate of intake air in the engine, 5 a throttle valve adapted to regulate the flow rate of intake air and control an output from the engine 1, 6 a sensor adapted to detect a degree of opening of the throttle valve 5, 7 an injector adapted to supply a fuel a flow rate of which corresponds to that of the intake air, 8 an ignition plug adapted to ignite a gaseous mixture in a combustion chamber of the engine, 9 an $O_2$ sensor provided in an exhaust passage 10 of the engine and adapted to detect an amount of oxygen residing in an exhaust gas, and 11 a three-element catalyst for purifying an exhaust gas.

A reference numeral 12 denotes a crank angle detecting sensor plate mounted on a crankshaft 1a of the engine 1 and adapted to detect a rotational position (crank angle) of the crankshaft 1a in cooperation with a crank angle sensor 13, 14 a cam angle detecting sensor plate mounted on a cam shaft 1b of the engine 1 and adapted to detect an angle of rotation (cam angle) of the cam shaft 1b in cooperation with a cam angle sensor 15, 16 a driving unit formed of a hydraulic control valve and adapted to control a position of a cam 1c, which is mounted on the cam shaft 1b driven by the crankshaft 1a, relative to the crankshaft 1a by controlling a supply oil pressure and a supply oil flow rate with respect to an actuator (not shown) mounted on the cam shaft 1b of the engine, and control an angle of rotation (cam phase) of the cam shaft 1b with respect to the crankshaft 1a within a predetermined range. The driving unit 16 and actuator (not shown) constitute a valve timing varying means.

A reference numeral 17 denotes a control means adapted to control a phase of a cam in accordance with the operating condition of the engine 1 and carry out various other control operations for the engine 1, and 18 an ignition unit adapted to supply an ignition voltage to an ignition plug 8. The cam shaft 1b and cam 1c shown in FIG. 1 are used to control intake air. Although a description to be given below is description about a control operation for a valve for intake air, the controlling of an exhaust valve and both intake and exhaust valves can also be done.

In the internal combustion engine 1 having such a construction, the rotation of the crankshaft 1a is transmitted to the cam shaft 1b via a timing belt or a chain. For example, a sprocket (not shown), etc. on the cam shaft 1b are provided with an actuator for the valve timing varying means. Since the crankshaft 1a and cam shaft 1b are formed so that a relative position of rotation thereof can be varied within a predetermined range, a rotational position of the crankshaft 1a relative to the cam 1c, which is rotated with the cam shaft 1b in a body, can also be varied within a predetermined range. The timing of an operation of at least one of the intake and exhaust valves is set controllable with respect to a crank angle, and this timing operation is controlled in accordance with a control variable with respect to the driving unit 16.

A flow rate of the intake air supplied to the engine 1 is measured with the air flow sensor 4. The control means 17 controls the injector 7 so that a fuel a flow rate of which corresponds to that of the intake air is injected, and also the igniter 18 by computing a suitable ignition timing. A burnt exhaust gas is purified by the three-element catalyst 11 provided in the intake passage 10. In order to improve an exhaust gas purification efficiency to the highest possible level, an amount of residual oxygen in the exhaust gas is detected by the $O_2$ sensor 9 provided in the exhaust passage 10, and control means 17 carries out a feedback control operation so that the gaseous mixture has a theoretical mixture ratio.

Figure 2:
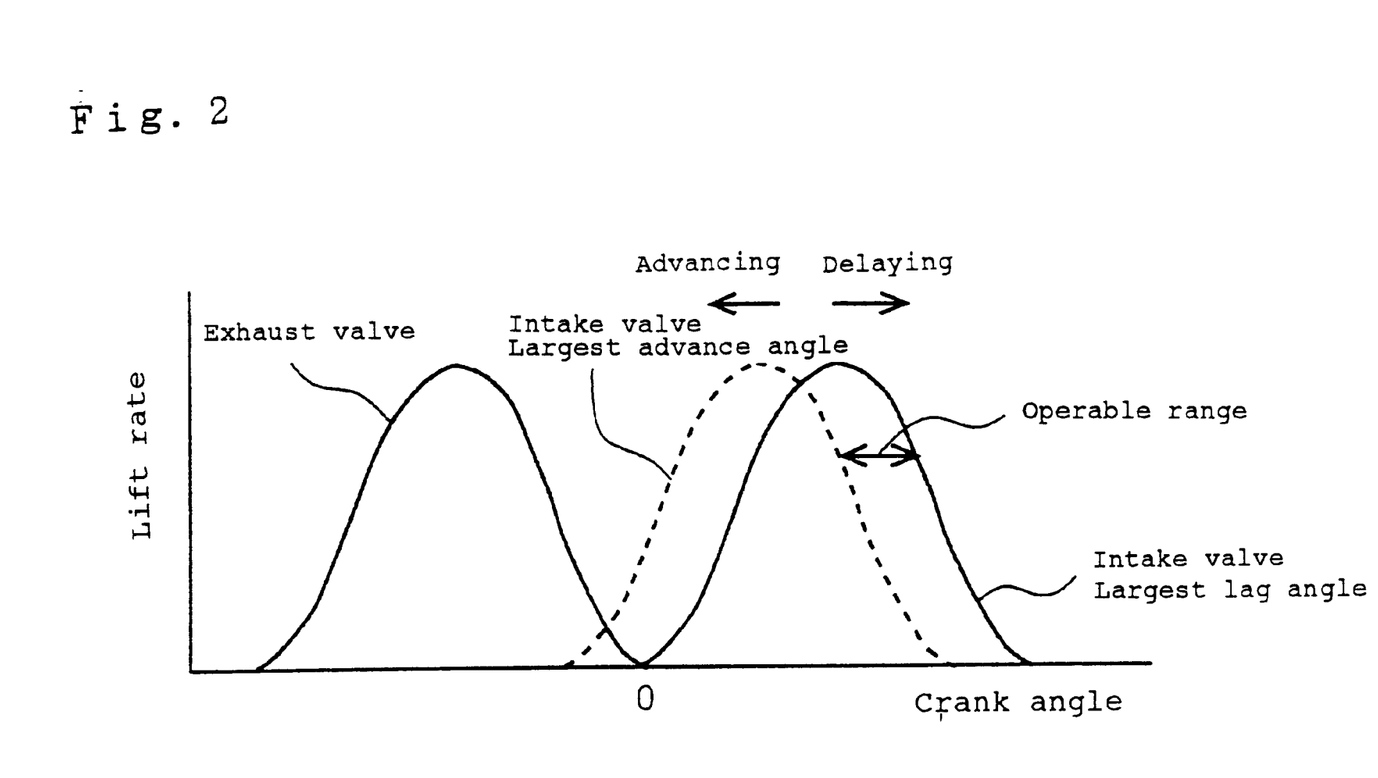
FIG. 2 is a diagram showing the valve timing characteristics of the mode 1 of embodiment of the valve timing control apparatus for internal combustion engines according to the invention.

FIG. 2 shows a lift rate of each valve with respect to an angle of rotation of the crankshaft 1a in a case where a rotational phase with respect to the crankshaft 1a is fixed on the side of the exhaust valve and variable on the side of the intake valve. The timing of the intake valve can be varied in a range between a solid line and a broken line. The solid line represents a position of a largest lag angle in which an amount of overlap of a valve with respect to the exhaust valve becomes smallest, and the broken line a position of a largest advance angle in which a valve overlap amount becomes largest. Therefore, the advancing of the timing of an operation of a valve is the controlling of the timing of a valve in the direction in which the amount of overlap of a valve increases, while the delaying of the timing of an operation of a valve is the controlling of the timing of a valve in the direction in which the amount of overlap of a valve decreases. The timing of an operation of a valve can be retained in an arbitrary position between a position of the largest lag angle and that of the largest advance angle in accordance with a control variable of the control means 17.

Figure 3:
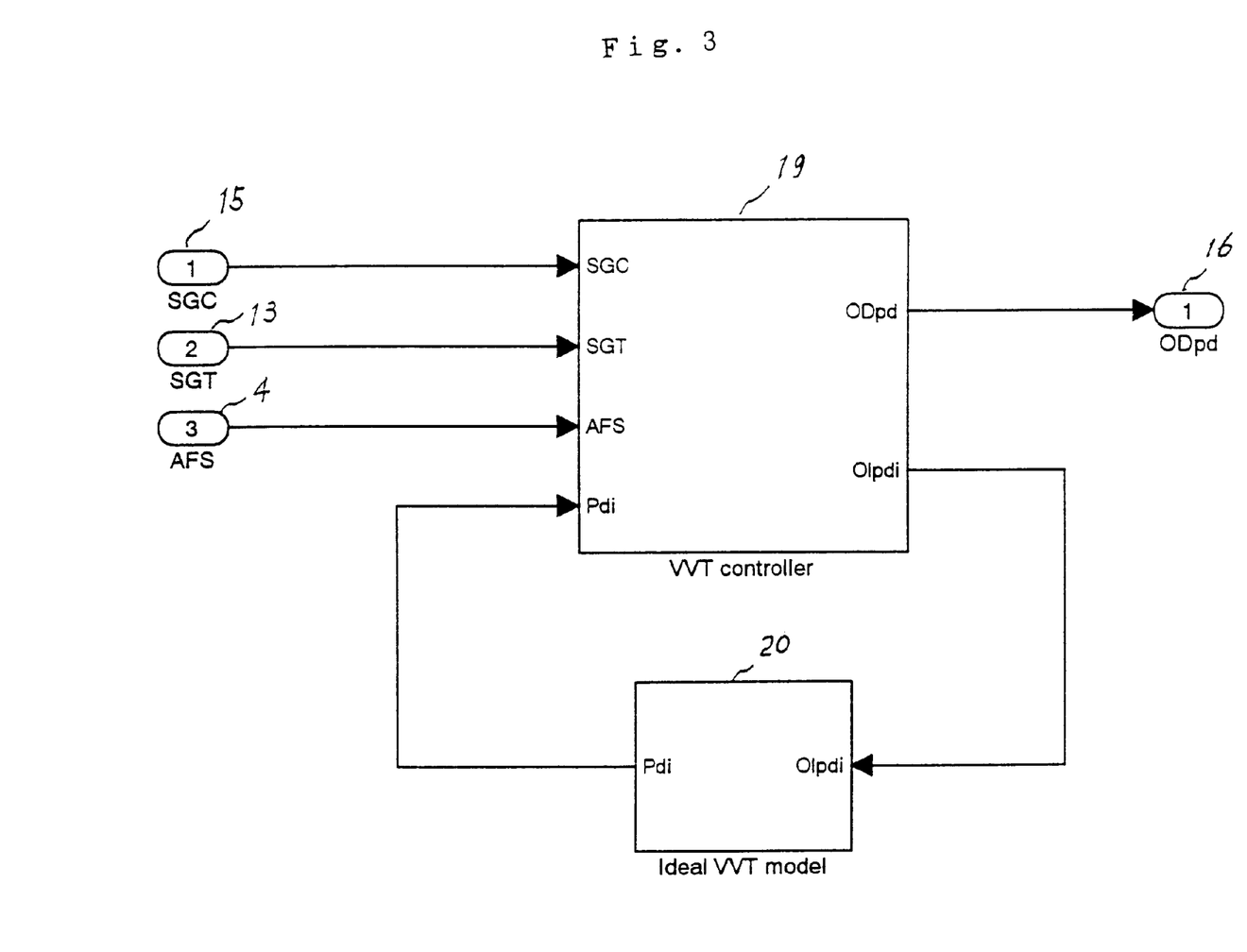
FIG. 3 is a block diagram of a control means in the mode 1 of embodiment of the valve timing control apparatus for internal combustion engines according to the invention.

FIG. 3 is a block diagram showing the controlling of a valve timing. Referring to the drawing, a reference numeral 19 denotes a computation control means adapted to compute the valve timing, and 20 a normative characteristics computation unit. The computation control means 19 is adapted to receive a signal SGC from a cam angle sensor 15, a signal SGT from a crank angle sensor 13 and a signal AFS from the air flow sensor 4, compute a valve timing position and a charging efficiency of the internal combustion engine 1, compute a control variable ODpd on the basis of the results of the computation, and output a signal representative of the final results to the driving unit 16 of the valve timing varying means. The computation control means 19 outputs a normative target current value Olpdi to the normative characteristics computation unit 20, which then computes a normative advance rate Pdi on the basis of model characteristics of the valve timing varying means fixed to the engine 1. The computation control means 19 receives the results of this computation, and corrects a control variable ODpd to be outputted to the driving unit 16 of the valve timing varying means. The detailed construction and operations of the computation control means 19 and normative characteristics computation unit 20 will be described below.

Figure 4:
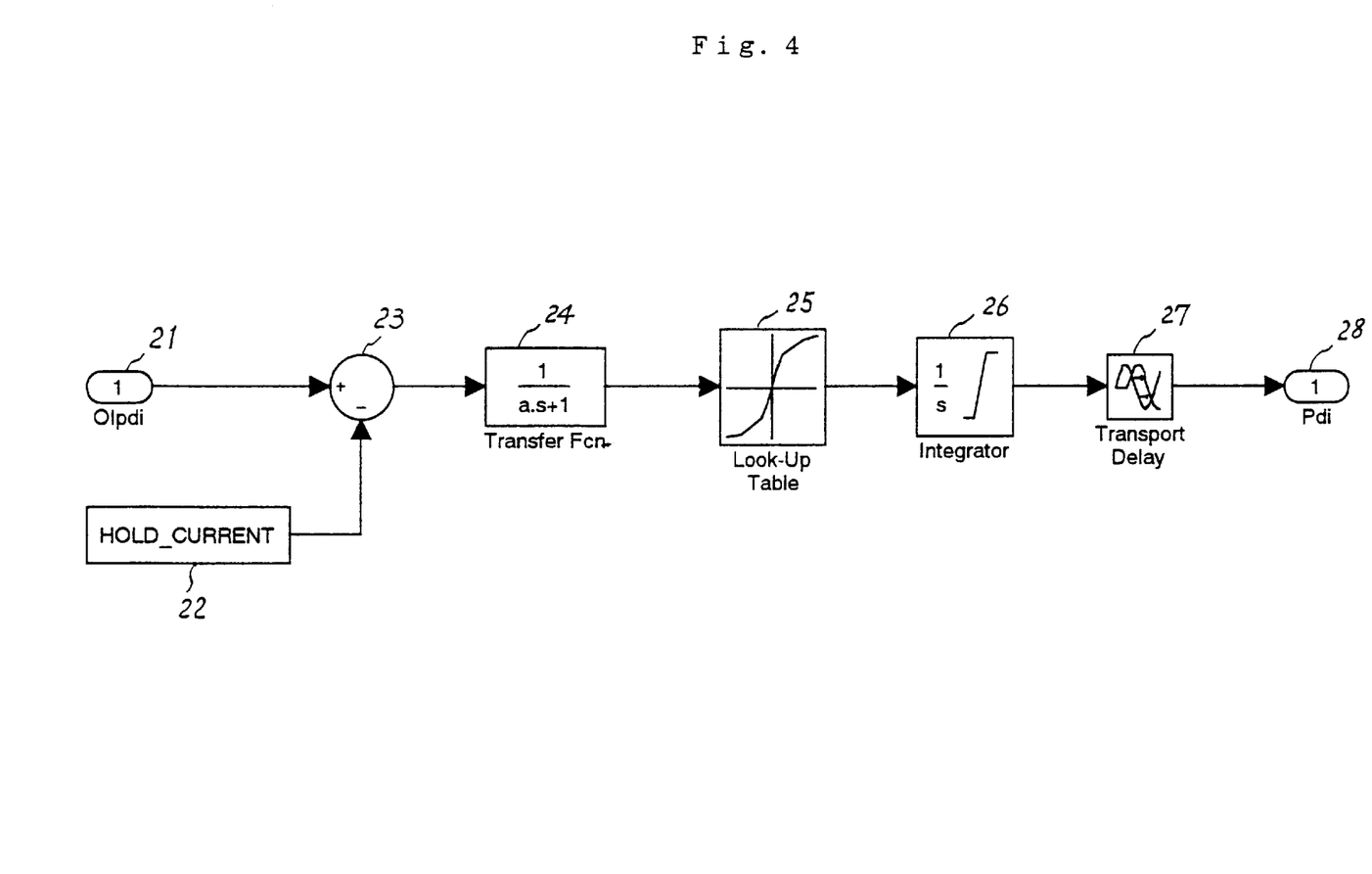
FIG. 4 is a block diagram of a normative characteristics computation unit in the mode 1 of embodiment of the valve timing control apparatus for internal combustion engines according to the invention.

The normative characteristics computation unit 20 has the construction shown in FIG. 4. Referring to the drawing, a reference numeral 21 denotes an input member adapted to receive a normative target current value Olpdi from the computation control means 19, 22 a member adapted to generate with a valve timing varying speed set to zero a normative holding current value constituting a control variable for retaining a position of rotation of the cam 1c relative to the crankshaft 1a, 23 subtractor adapted to subtract a normative holding current value from a normative target current value Olpdi and generate a current deviation based on a holding current, and 24 a member adapted to make first-order lag computation with respect to a current deviation inputted therein to with a lag in a driving circuit, etc. taken into consideration.

A reference numeral 25 denotes a look-up table adapted to convert a current deviation into a variable acceleration (crank angle deg/sec) of a crank angle with reference to a conversion table in which a current deviation is received and set, and 26 an integrator adapted to receive a variable acceleration of a crank angle and convert the same into a crank angle Pdi, and output the crank angle Pdi as a normative advance rate from an output member 28 to the computation control means 19 by delaying the output time by a period of time, which corresponds to dead time, by a lag processing member 27. A time constant of the first-order lag computation member 24, the conversion table of the look-up table 25 and the dead time of the lag processing member 27 are set to such levels that permit ideal model characteristics capable of obtaining a normative value of the valve timing varying means fixed to the engine 1 to be attained, or by using a value of a median of the characteristics of the valve timing varying means.

Figure 5:
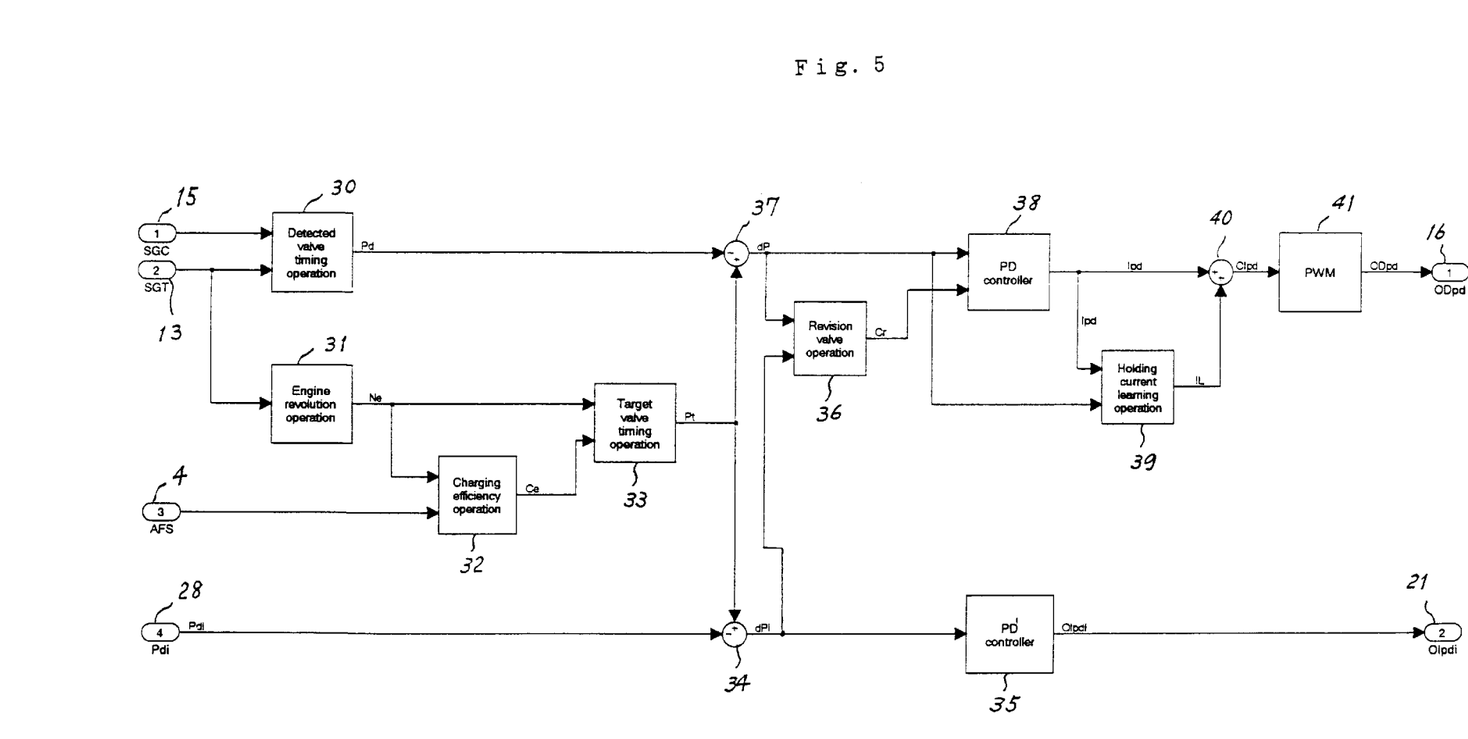
FIG. 5 is a block diagram of a computation control means in the mode 1 of embodiment of the valve timing control apparatus for internal combustion engines according to the invention.

FIG. 5 is a block diagram showing the construction of the computation control means 19. Referring to the drawing, a reference numeral 30 denotes a valve timing detector adapted to receive a signal SGC from the cam angle sensor 15 and a signal SGT from the crank angle sensor 13, and compute a detected advance rate Pd, i.e. actual valve timing, and 31 a detector adapted to detect a rotational speed of the engine 1 on the basis of a signal SGT from a crank angle sensor 13. A rotational speed Ne of the engine detected by this detector is sent to a charging efficiency computation unit 32, in which a charging efficiency Ce representative of a load condition of the engine 1 is computed on the basis of the rotational speed Ne and an intake air flow rate signal AFS from the air flow sensor 4.

A reference numeral 33 denotes a target advance rate computation unit adapted to receive, for example, a rotational speed Ne and a charging efficiency Ce, interpolate and refer to a preset two-dimensional map, and compute a target valve operating position, i.e. a target advance rate Pt suitable for the operating condition of the engine 1, and 34 a subtractor adapted to receive a target advance rate Pt and a normative advance rate Pdi which is outputted from the output member 28 of the above-mentioned normative characteristics computation unit 20, determine a difference therebetween as a normative advance rate deviation dPi, and output the deviation to a PD controller 35 and a correction value computation unit 36. This PD controller 35 has the construction shown in FIG. 6.

Figure 6:
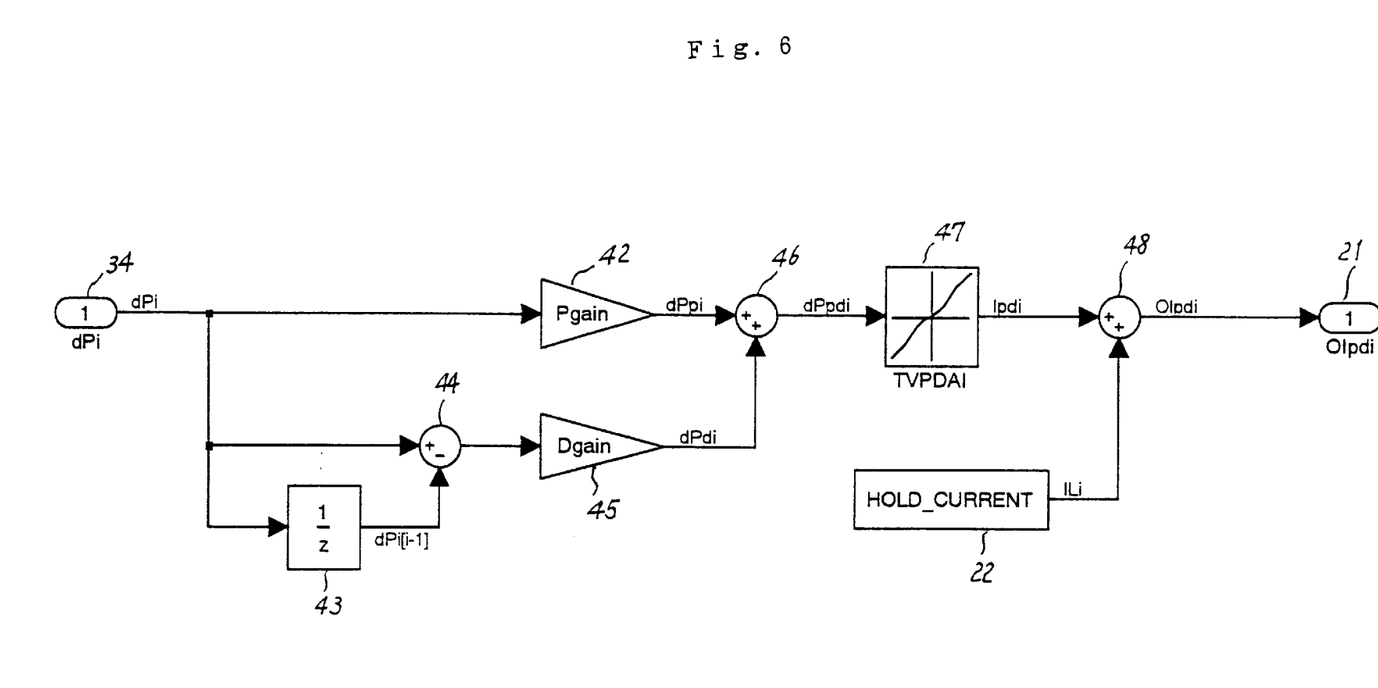
FIG. 6 is a block diagram of a FD controller in the mode 1 of embodiment of the valve timing control apparatus for internal combustion engines according to the invention.

Referring to FIG. 6, a normative advance rate deviation dPi generated in the subtracter 34 of FIG. 5 is inputted into a multiplier 42 holding a proportional gain Pgain, in which the proportional gain Pgain is multiplied by the normative advance rate deviation dPi to generate a normative proportional value dPpi. The normative advance rate deviation dPi is also inputted into a storage unit 43, in which this deviation is stored as a preceding value (dPi(i−1)) of a normative advance rate deviation. In a subtractor 44, a difference between an actual normative advance rate deviation dPi and a preceding normative advance rate deviation (dPi (i−1)) is determined, and the difference is inputted into a multiplier 45 holding a differential gain Dgain, the difference being multiplied by the gain Dgain to determine a normative differential value dPdi.

A reference numeral 46 denotes an adder adapted to determine a target normative advance speed dPpdi, is a target displacement speed by adding a normative proportional value dPpi and a normative differential value dpdi to each other, and also a target normative current value deviation Ipdi by interpolating and referring to a table value stored in a target normative current computation unit 47, 22 a normative holding current generating unit adapted to generate a holding current to be supplied to the driving unit 16 for valve timing varying means so that the valve timing varying means retains a predetermined position as mentioned above. A normative holding current value ILi generated by the generating unit 22 and a target normative current value deviation Ipdi are added to each other in an adder 48, and the sum is supplied as a target normative current value Oipdi to an input member 21 of the normative characteristics computation unit 20. Accordingly, the PD controller 35 and the normative characteristics computation unit 20 shown in FIG. 4 form a closed loop, and are necessarily feedback controlled.

Figure 7:
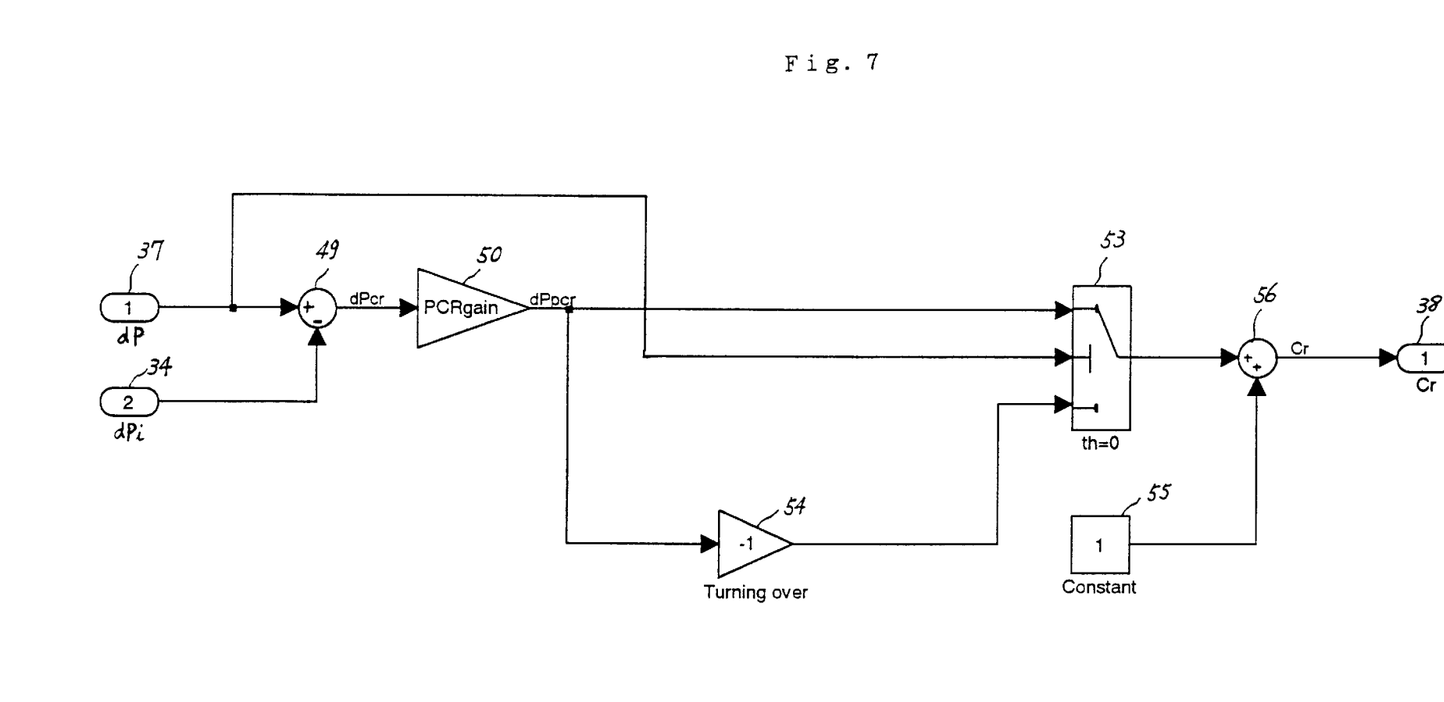
FIG. 7 is a block diagram of a correction rate computation unit in the mode 1 of embodiment of the valve timing control apparatus for internal combustion engines according to the invention.

Returning to FIG. 5, a detected advance rate Pd from the valve timing detector 30 and a target advance rate Pt from the target advance rate computation unit 33 are inputted into the subtractor 37, and an advance angle rate deviation dP is determined. This advance rate deviation dP and the above-mentioned normative advance rate deviation dPi are inputted into the correction value computation unit 36. The correction value computation unit 36 has the construction shown in FIG. 7, and is adapted to determine a correction amount for the responsibility with respect to the valve timing varying means. Referring to FIG. 7, an advance rate deviation dP from the subtractor 37 and a normative advance rate deviation dPi from the subtractor 34 are inputted into a subtractor 49, and the deviation dP is subtracted from the deviation dPi to determine a deviation dPcr. In a multiplier 50, the deviation dPcr is multiplied by a gain PCRgain to obtain a correction amount dPpcr, which is inputted into a judgement unit 53.

The advance rate deviation dP is inputted as a judgement value into the judgement unit 53. When the advance rate deviation dP has a value not smaller than zero, the correction value dPpcr is outputted as it is, and, when the deviation dP has a value smaller than zero, (-dPpcr) which is inputted via a code reversion unit 54 is outputted. Namely, when a response speed of a detected advance rate Pd is lower than that of a normative advance rate Pdi with respect to a target advance rate Pt, a difference between the deviations dP, Pdi becomes (+), so that the correction value has a positive value. When the two advance rates have relation contrary to that thereof in the above-mentioned case, the correction value has a negative value. A reference numeral 55 denotes a constant generating unit, and a constant of 1.0 is added in an adder 56, the sum being outputted as a correction coefficient Cr to the PPD controller 38 shown in FIG. 5. Therefore, when the responsibility is low, the correction coefficient Cr becomes not smaller than 1.0, i.e., the correction coefficient is increased by subjecting it to multiplication when correction is made, by which the responsibility is corrected in an increasing direction. Conversely, when the responsibility is high, the correction coefficient Cr becomes not larger than 1.0, i.e., the correction coefficient is reduced by subjecting it to multiplication when correction is made, by which the responsibility is corrected in a decreasing direction.

Returning again to FIG. 5, a advance rate deviation dP determined as a difference between a detected advance rate Pd and a target advance rate Pt in the subtractor 37 is inputted into the PD controller 38 which is adapted to control a valve timing operation. A correction coefficient Cr from the correction value computation unit 36, which was described in detail with reference to FIG. 7, is also inputted into the PD controller 38, and a target current deviation Ipd with respect to the driving unit 16 for the valve timing varying device is determined. In this PD controller 38, the constants (proportional gain, differential gain and advance speed versus current value deviation table) identical with those for the PD controller 35 for controlling the normative characteristics computation unit 20 are set, and a difference between operations of these PD controllers resides only in the correction operations using a correction coefficient Cr.

Figure 8:
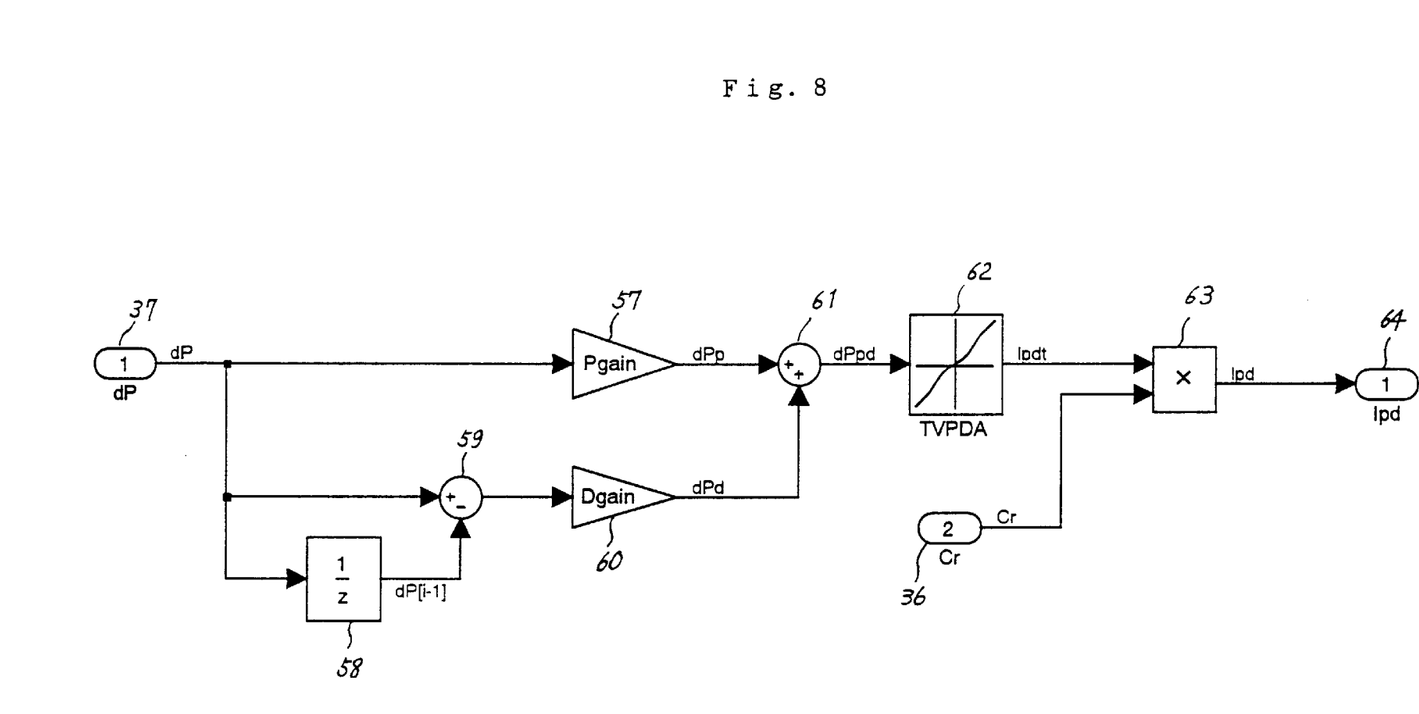
FIG. 8 is a block diagram of the PD controller in the mode 1 of embodiment of the valve timing control apparatus for internal combustion engines according to the invention.

A drawing showing the construction of this PD controller 38 is a block diagram of FIG. 8. Referring to FIG. 8, an advance rate deviation ddP from the subtractor 37 is inputted into a multiplier 57 holding a proportional gain Pgain, in which the deviation dP is multiplied by the proportional gain Pgain to generate a proportional value dPp. The advance rate deviation dP is inputted into a storage member 58, in which the deviation is stored as a preceding value (dp(i−1)) of the advance rate deviation. In a subtractor 59, a difference between an actual advance rate deviation dP and the preceding advance rate deviation (dP(i−1)) is determined, and a difference thus determined is inputted into a multiplier 60 holding a differential gain Dgain, the difference between dP and (dP(i−1)) being multiplied by Dgain to obtain a differential value dPd.

A reference numeral 61 denotes an adder, in which a proportional value dPp and a differential value dPd are added to each other. Thus, a target advance speed dPpd, i.e. a displacement speed of the valve timing varying means is determined, and then a target current value deviation Ipdt by interpolating and referring to a table value stored in a target current deviation computation unit 62. A reference numeral 36 denotes a correction value computation unit adapted to determine a correction coefficient for the responsibility mentioned above. A correction coefficient Cr outputted from this correction value computation unit 36 and a target current value deviation Ipdt outputted from the target current deviation computation unit 62 are multiplied together by a multiplier 63, and a difference in responsibility of an actual advance rate Pd with respect to a normative advance rate Pdi is corrected, the results being outputted as a target current value deviation Ipd from the output member 64.

Returning to FIG. 5, a reference numeral 39 denotes a holding current learning unit adapted to learn a control current with respect to a control variable with respect to the driving unit 16, for example, a control current with respect to a hydraulic control valve in the condition in which, for example, a detected actual advance rate has followed up a target advance rate with an advance position, i.e. a valve timing position in a stable condition. The control variable thus learned is stored in a backup RAM, and continues to be stored unless a backup power source is cut off. A reference numeral 40 denotes an adder, in which a target current value deviation Ipd outputted from the FD controller 38 and a learned holding current value IL outputted from the holding current learning unit 39 are added to each other, and the sum is outputted as a signal of a target current value Oipd to a PWM modulator 41, from which the signal is outputted as a target current value Oipd to the driving unit 16 for the valve timing varying means.

Thus, ideal characteristics are set by using a time constant of the normative characteristics computation unit 20 and a conversion table as those of a normative model, and a crank angle determined on the basis of the normative models and an actually detected crank angle are compared with each other. A correction rate is computed on the basis of a deviation determined by this comparison, and corrections are made. Therefore, it becomes possible to bring the responsibility of the valve timing control apparatus, which is practically fixed to an internal combustion engine, close to that of the normative model, i.e. an ideal responsibility, and stabilize the performance of the engine 1 without being influenced by a scatter of the construction of the driving unit 16, etc. occurring during the manufacturing thereof. When the above-mentioned control operation is carried out, the variation of the performance of the valve timing control apparatus due to the variation thereof occurring with the lapse time can be offset, and the manufacturing tolerance of the living unit 16, etc. can be alleviated.

Although proportional computation is described as a correction computation method in the above statement, using other computation methods, such as even differential computation, integration computation and the like also enables the same effect to be obtained. Although corrections are made by using a crank angle of a normative model, it is also possible to store the results only of computation made in advance, as data concerning the responsibility in the conversion table. These methods can be applied not to the controlling of an intake valve but to the controlling of an exhaust valve as well.

What is claimed is:

1. A valve timing control apparatus for internal combustion engines comprising;

a cam adapted to be driven by a crankshaft of an internal combustion engine and open and close an intake valve, a cam adapted to be driven by the crankshaft of the engine and open and close an exhaust valve, a valve timing varying means adapted to vary a rotational phase of at least one of the two cams with respect to the crankshaft, a detector adapted to detect an acting position of the valve timing varying means, and a control means adapted to output a control variable for the valve timing varying means, wherein the control means stores the characteristics constituting a norm for the valve timing varying means, computes a target valve operating position corresponding to the operating condition of the engine, and determines the control variable of the valve timing varying means with respect to the target valve operating position on the basis of the results of a comparison between a valve timing position detected by the acting position detector and a valve timing position included in the norm-constituting characteristics.

2. A valve timing control apparatus for internal combustion engines according to claim 1, wherein the characteristics constituting the norm for the valve timing varying means are formed of model characteristics of a valve timing varying device fixed to an internal combustion engine.

3. A valve timing control apparatus for internal combustion engines according to claim 1, wherein an acting position of the valve timing varying means is detected by the detector in accordance with an angle of rotation of the crankshaft or that of rotation of one of the cams.

* * * * *